United States Patent [19]

Cambern

[11] 4,136,328
[45] Jan. 23, 1979

[54] TAMPER-PROOF SEATBELT SYSTEM

[75] Inventor: Bruce P. Cambern, Dearborn, Mich.

[73] Assignee: Ford Motor Company, Dearborn, Mich.

[21] Appl. No.: 226,101

[22] Filed: Feb. 14, 1972

[51] Int. Cl.$^2$ ............................................. B60R 21/10
[52] U.S. Cl. ................................... 340/52 E; 340/667; 307/10 SB; 180/82 C
[58] Field of Search .......................... 340/52 E, 278; 307/10 SB; 180/82 C, 103

[56] References Cited

U.S. PATENT DOCUMENTS

| | | | |
|---|---|---|---|
| 3,215,221 | 11/1965 | Rayman | 180/82 C |
| 3,449,714 | 6/1969 | Farley, Jr. | 340/52 E |
| 3,462,732 | 8/1969 | Griffin | 340/52 E |

Primary Examiner—Alvin H. Waring
Attorney, Agent, or Firm—Robert W. Brown; Clifford L. Sadler

[57] ABSTRACT

A tamper-proof electrical circuit for a motor vehicle seatbelt system may be used with a seatbelt system requiring the driver and passenger of the motor vehicle to fasten their respective seatbelts if the vehicle engine is to be started. The tamper-proof circuit provides a warning and/or disables a portion of the vehicle electrical circuitry, such as the ignition start circuit or the vehicle's fuel gauge, if the ignition interlock device or a warning device or one of the seatbelt sensing devices has been removed from the electrical circuit. Also, a warning device or a device for disabling a vehicle circuit may be actuated if a seatbelt has been held in an extended position in the absence of an occupant in the seating position corresponding to that seatbelt location. This inconveniences the vehicle driver who fastens or who allows another to fasten a seatbelt in an extended position other than around his body.

15 Claims, 2 Drawing Figures

| SWITCH | LOCATION | OPERATION |
|---|---|---|
| S1 | L.H. BELT RETRACTOR | OPEN WHEN LEFT BELT IS EXTENDED |
| S2 | L.H. SEAT SENSOR | CLOSED WHEN LEFT SEAT IS OCCUPIED |
| S3 | R.H. BELT RETRACTOR | OPEN WHEN RIGHT BELT IS EXTENDED |
| S4 | R.H. SEAT SENSOR | CLOSED WHEN RIGHT SEAT IS OCCUPIED |

TAMPER-PROOF SEATBELT SYSTEM

BACKGROUND OF THE INVENTION

This invention relates to a tamper-proof seatbelt system for a motor vehicle and, more particularly, to a tamper-proof electrical circuit for use in association with retractable seatbelts designed to restrain and protect vehicle occupants.

It has been statistically demonstrated that seatbelt restraint systems for motor vehicles when properly used substantially reduce the risk of injury to vehicle occupants. In spite of this, motorists have been reluctant to use seatbelts. In order to encourage the use of seatbelts, motor vehicles built in the United States are now equipped with warning buzzers and warning lights to remind vehicle occupants to fasten their seatbelts. In the future, vehicles will not only be equipped with warning buzzers and warning lights, but also will be equipped with ignition interlock systems which will prevent the engine of the motor vehicle from being started if seatbelts are not fastened.

The typical ignition interlock seatbelt system of the prior art employs for each setting position a first switching device for sensing whether or not the seatbelt is in a retracted or in an extended position and a second switching device, usually a load sensing switch built into the seat, for sensing whether or not the seating position is occupied. An electrical relay or the like having a switching contact in the vehicle's ignition starting circuit is connected with the first and second switching devices. Failure to extend or buckle the seatbelt corresponding to a given occupied seating position energizes the relay and prevents the vehicle's engine from being started. Also, a buzzer and/or warning light may be energized simutaneously. In this prior art system, there is nothing to prevent a vehicle occupant from defeating the ignition interlock system by fastening his seatbelt behind him or by otherwise tampering with the electrical circuit by physically removing, short-circuiting, or cutting the lead wires of the warning devices, sensing switches, and ignition-circuit relay contact.

SUMMARY OF THE INVENTION

It is an object of the present invention to prevent vehicle occupants from tampering with an ignition interlock and/or warning device included as a part of a motor vehicle seatbelt system. It is a further object to provide a tamper-proof electrical circuit which may be connected with switching devices for sensing whether a seatbelt is in a retracted or in an extended position and for sensing whether or not the seating position corresponding to that seatbelt location is occupied. It is a further object to provide a tamper-proof electrical circuit interconnecting these sensor switches with one or more seatbelt warning devices and with an ignition interlock device.

The electrical circuit of the invention includes a circuit for sensing a condition in which a first switching device indicates that a seatbelt is in an extended position while a second switching device indicates that the corresponding vehicle seating position is unoccupied, and to provide a circuit for disabling at least a portion of the electrical circuitry in the motor vehicle subsequent to the sensing of this condition.

These and other objects of the invention may be better understood by reference to the detailed description which follows and to the drawings.

DETAILED DESCRIPTION

With reference now to the drawings, wherein like part designations in the two figures refer to like elements of the electrical circuits, there are shown two embodiments for tamper-proof electrical circuitry for use in a motor vehicle seatbelt system.

Figure 1:
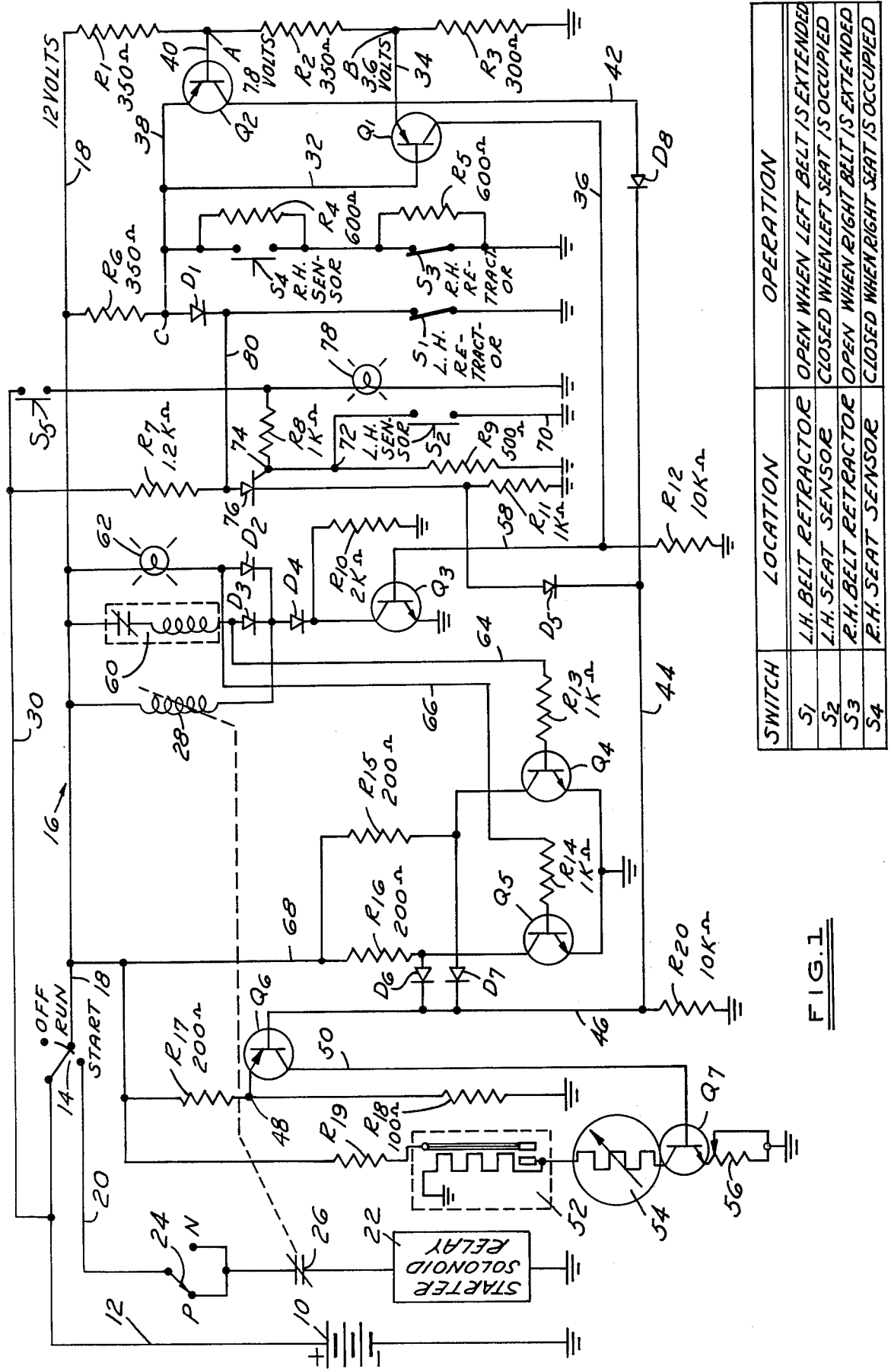
FIG. 1 is a schematic diagram of a tamper-proof electrical circuit for a motor vehicle seatbelt system.

In the embodiment of FIG. 1, a direct current source of electrical energy 10, such as a motor vehicle storage battery, has its negative terminal connected to ground and its positive terminal connected by a line 12 to an ignition switch 14. The ignition switch 14 preferably is typical of those used in automotive vehicles, that is, it includes "off," "run," and "start," positions. When the ignition switch is in the "run" position as indicated in FIG. 1, the storage battery 10 supplies electrical energy to a tamper-proof electrical circuit, generally designated by the numeral 16, through a line 18. When the ignition switch 14 is in contact with its pole designated "start," a bridging contact on the switch arm also engages the pole designated "run," and, thus, electrical energy is supplied through the line 18 to the tamper-proof electrical circuit 16 when the switch 14 is in either the "run" or "start" positions.

When the source of electrical energy 10 is connected with the ignition-switch pole designated "start," electrical energy may be supplied through a line 20 to a starter relay 22, which when energized supplies electrical energy to the usual starter motor for the vehicle's engine. A transmission switch 24, which may have a park terminal P and a neutral terminal N, may be positioned between the ignition switch 14 and the starter solenoid relay 22 for the purpose of insuring that the vehicle's transmission is not in gear during the engine starting operation. Also, a normally closed relay contact 26 is connected in series with the starter solenoid relay 22. This relay contact 26 forms an ignition interlock and is operated by a relay coil 28 in the tamper-proof electrical circuit 16.

A line 30 directly connects the line 12 and source of electrical energy 10 to a portion of the tamper-proof electrical circuit 16, thus, bypassing the ignition switch 14 as to that circuit portion.

The tamper-proof electrical circuit 16 of FIG. 1 is designed for use in a left-hand drive motor vehicle having a driver or left-hand seating position equipped with a retractable seatbelt and having a right-hand or passenger seating position also equipped with a retractable seatbelt. For the left-hand or driver seating position, a left-hand belt-retractor switch $S_1$ is provided and a left-hand seat-sensor switch $S_2$ is also provided. The switch $S_1$ is in a closed position when the left-hand seatbelt is retracted and is in an open position when the left-hand seatbelt is extended. The left-hand seat-sensor switch $S_2$ is closed when the left-hand seating position is occupied and is otherwise open. For the right-hand seating position, a seat-belt retractor switch $S_3$ and a seat-sensor switch $S_4$ are provided. The right-hand retractor switch $S_3$ is closed when the right-hand seatbelt is retracted and is open when it is extended. The right-hand seat-sensor switch $S_4$ is closed when the right-hand seating position is occupied and is open otherwise. In a known manner, the retractor switches $S_1$ and $S_3$ may be incorporated in the seatbelt-retractor mechanism, and the seat-sensor switches $S_2$ and $S_4$ may be of the load sensing type incorporated into the motor vehicle seats. The bottom portion of FIG. 1 contains a list of the above described switches, their locations, and their operation.

The tamper-proof electrical circuit 16 includes a voltage divider formed by three resistors, $R_1$, $R_2$ and $R_3$. The junction between resistors $R_1$ and $R_2$ is designated by the letter A, and the junction between resistors $R_2$ and $R_3$ is designated by the letter B. The voltage divider formed by the resistors $R_1$, $R_2$ and $R_3$ is connected between the voltage supply line 18 and ground.

A resistor $R_6$ has one of its terminals connected to the supply line 18 and has its other terminal connected at a junction designated by the letter C to the anode of a diode $D_1$. The cathode of the diode $D_1$ is connected to one pole of the left-hand seatbelt retractor switch $S_1$, the other pole of which is connected to ground. Also connected to the junction C is the right-hand seat-sensor switch $S_4$, which has a resistor $R_4$ connected in parallel with it, and connected in series with switch $S_4$ is the right-hand seatbelt-retractor switch $S_3$, which also has a resistor $R_5$ connected in parallel with it.

A PNP transistor $Q_1$ has its base connected by a line 32 to junction C. The transistor $Q_1$ has its emitter connected to junction B by a line 34 and has its collector connected by a line 36 to one terminal of a resistor $R_{12}$, the other terminal of which is connected to ground. Another PNP transistor $Q_2$ has its emitter connected by a line 38 to the junction C and has its base connected by a line 40 to the junction A. The collector of the transistor $Q_2$ is connected through a line 42 to the anode of a blocking diode $D_8$, and the cathode of this diode is connected by a line 44 to a line 46. A resistor $R_{20}$ has one of its terminals connected to ground and has its other terminal connected by the line 46 to the base of a PNP transistor $Q_6$.

The emitter of the transistor $Q_6$ is connected to a junction 48 formed between a resistor $R_{17}$ and a resistor $R_{18}$. The resistors $R_{17}$ and $R_{18}$ from a voltage divider connected between the supply line 18 and ground. The collector of the transistor $Q_6$ is connected by a line 50 to the base of an NPN transistor $Q_7$. Thus, the transistor $Q_6$ supplies the base drive for the transistor $Q_7$. The transistor $Q_7$ is used to disable a portion of the electrical circuitry of the motor vehicle.

In FIG. 1, the output of the transistor $Q_7$ is used to disable the fuel gauge circuit of the motor vehicle, although other suitable circuitry of the vehicle may be chosen for deactivation by the transistor $Q_7$. The fuel gauge circuit may include a thermally-operated voltage regulator 52 connected to supply line 18 through a current-limiting resistor $R_{19}$. Voltage regulator 52 is connected in series with a bimetal fuel guage 54 which is, in turn, connected to the collector of the transistor $Q_7$. The emitter of the transistor $Q_7$ is connected to a variable resistance fuel sender 56.

An NPN transistor $Q_3$ has its base connected by a line 58 to one terminal of the resistor $R_{12}$, and it has its emitter connected to ground. The collector of the transistor $Q_3$ is connected to one terminal of a resistor $R_{10}$, the other terminal of which is connected to ground.

The transistor $Q_3$ is used to energize the ignition interlock relay coil 28, a warning buzzer 60, and a warning light 62. The elements 28, 60 and 62 are connected in parallel with one another and each has one of its terminals connected to the supply line 18. The other terminal of the warning light 62 is connected to the anode of a diode $D_2$, and the other terminal of the warning buzzer 60 is connected to the anode of a diode $D_3$. The cathodes of the diodes $D_2$ and $D_3$ are connected together and to the other terminal of the ignition interlock relay coil 28 which, in turn, is connected to the anode of a diode $D_4$. The cathode of the diode $D_4$ is connected to the collector of the transistor $Q_3$.

An NPN transistor $Q_4$ has its base connected through a resistor $R_{13}$ and a line 64 to the junction formed between the warning buzzer 60 and the diode $D_3$. Similarly, another NPN transistor $Q_5$ has its base connected through a resistor $R_{14}$ and a line 66 to the junction formed between the warning light 62 and the diode $D_2$. The emitters of the transistors $Q_4$ and $Q_5$ are connected to ground. The collector of the transistor $Q_4$ is connected to the anode of a diode $D_7$, and the collector of the transistor $Q_5$ is connected to the anode of a diode $D_6$. The cathodes of the diodes $D_6$ and $D_7$ are connected to the line 46. The collectors of the transistors $Q_4$ and $Q_5$ are also connected, respectively, through resistors $R_{15}$ and $R_{16}$ and a line 68 to the voltage supply line 18.

The circuit portion to which the left-hand seat-sensor switch $S_2$ is connected remains to be described. Switch $S_2$ has one of its poles connected to ground by a line 70 and has its other pole connected to a junction 72 formed between a resistor $R_9$ and the gate terminal 74 of a memory device in the form of a controlled rectifier 76. The other terminal of the resistor $R_9$ is connected to ground. The anode voltage for controlled rectifier 76 is supplied from the line 30, which bypasses the ignition switch 14, through a resistor $R_7$. A line 80 also connects the anode of controlled rectifier 76 to the cathode of the diode $D_1$. The cathode of the controlled rectifier 76 is connected to one terminal of a resistor $R_{11}$, the other terminal of which is connected to ground, and the cathode of controlled rectifier 76 is also connected to the anode of a diode $D_5$. The cathode of diode $D_5$ is connected to the line 44.

A switch $S_5$ has one of its poles connected to the line 30 and has its other pole connected to one terminal of a resistor $R_8$, the other terminal of which is connected to the gate 74 of the controlled rectifier 76. Preferably, the switch $S_5$ is a courtesy light switch which is actuated by the opening of the left-hand or driver's door of the motor vehicle. In such case, switch $S_5$ is closed when the door is opened and supplies electrical energy to a light 78 within the vehicle passenger compartment.

The operation of the circuitry of FIG. 1 will now be described. In connection with this description, it will be assumed that the source of electrical energy 10 supplies a voltage to lines 18 and 30 of 12 volts. However, it will be apparent to one of oridinary skill in the art that this voltage may be varied, within limits, without affecting the operation of the tamper-proof circuit 16. Also, it will be assumed that the various resistors in the circuit have the values shown in the drawings.

Let it be assumed that the driver of the motor vehicle occupies his normal position and that he has fastened his seatbelt. In such case, the left-hand seatbelt-retractor switch is open because the seatbelt is extended. Also, the left-hand seat-sensor switch $S_2$ is closed. When the ignition switch 14 is placed in its "run" position, current then flows through the voltage divider formed by the resistors $R_1$, $R_2$ and $R_3$. The voltage at point A is 7.8 volts and the voltage at point B is 3.6 volts. Current also flows through the resistor $R_6$ and, because the right-hand seating position is assumed to be unoccupied, through the resistor $R_4$ and the right-hand seatbelt-retractor switch $S_3$ to ground. Thus, the resistor $R_6$ and the resistor $R_4$ form a voltage divider so that the voltage at point C is 7.6 volts. Because point A is at 7.8 volts and because the emitter-base junction of the transistor $Q_2$ is connected between points C and A, this junction is reverse-biased and the transistor $Q_2$ is non-conductive. Similarly, the base-emitter junction of the transistor $Q_1$ is connected between points C and B and the transistor $Q_1$ is also non-conductive.

If it is now assumed that the passenger or right-hand seating position is occupied as well as the left-hand seating position, then the right-hand seat-sensor switch $S_4$ will be closed, thereby, short-circuiting the resistor $R_4$. However, if the right-hand seatbelt has been extended, then the switch $S_3$ will have opened and current will flow to ground through a voltage divider formed by the resistor $R_6$, the switch $S_4$, and the resistor $R_5$. In this case, point C will again be at 7.6 volts and the transistors $Q_1$ and $Q_2$ will be nonconductive.

Again, let it be assumed that left-hand seating position is occupied and that the right-hand seating position is unoccupied. Furthermore, let it be assumed that the left-hand seatbelt is in a retracted condition so that the switch $S_1$ is closed. Under these conditions, turning the ignition switch to its "run" position will cause current to flow through resistor $R_6$ and through diode $D_1$ and switch $S_1$ to ground. If it is assumed that the voltage drop across the diode in $D_1$ is 0.7 volts, then point C will be at 0.7 volts with respect to ground. With point C at this voltage, the transistor $Q_2$ is non-conductive because its emitter-base junction is reversed-biased. However, 0.7 volts is applied to the base of the transistor $Q_1$ through line 32, and current flows from point B through the emitter-base junction of the transistor $Q_1$ to render it conductive. Thus, current will flow from the emitter of the transistor $Q_1$ to its collector and through the line 36 to the junction formed between the base of the transistor $Q_3$ and resistor $R_{12}$. This renders the transistor $Q_3$ conductive and current flows from the supply line 18 through the ignition interlock relay coil 28, opening its contact 26, through the warning buzzer 60, and through the warning light 62. With the relay contact 26 in an open condition, the vehicle driver will be unable to start the vehicle's engine, and he will be informed by means of the warning buzzer 60 and warning light 62 to fasten his seatbelt.

Let it now be assumed that the right-hand seating position is occupied, but that the seatbelt has not been extended. In such case, both the right-hand retractor switch $S_3$ and the right-hand sensor switch $S_4$ are closed. This connects the point C directly to ground, zero volts are applied to the base of the transistor $Q_1$ to render it conductive. Current then flows through the ignition interlock relay coil 28 and the warning devices 60 and 62.

Various attempts may be made to defeat the purpose of the seatbelt interlock and seatbelt warning system. The manner in which the tamper-proof electrical circuit 16 functions in various tampering modes will now be described.

Let it be assumed that the driver of the vehicle has at least temporarily defeated the seatbelt system by extending his seatbelt in a position other than around his body, for example, by buckling the seat belt behind him or by tucking it into a seat cushion. In this situation, the left-hand seat-sensor switch $S_2$ is closed, grounding the gate 74 of the controlled rectifier 76, and the left-hand seatbelt-retractor switch $S_1$ is open, permitting the vehicle's engine to be started. Point C is at 7.6 volts and transistors $Q_1$ and $Q_2$ are nonconductive, preventing a warning indication. However, when the driver stops the car, perhaps turns the ignition switch 14 to its "off" position, and opens the vehicle's door, the courtesy light switch $S_5$ is closed. This causes current to flow from the line 30 through the switch $S_5$ and the resistor $R_8$ to the controlled-rectifier gate terminal 74 and from there to ground through the left-hand seat-sensor switch $S_2$. When the driver exits from the vehicle, the left-hand seat-sensor switch $S_2$ opens. The current through switch $S_5$ and the resistor $R_8$ must then flow through the resistor $R_9$. This raises the voltage at the gate terminal 74 of controlled rectifier 76 to a level of about 4 volts. This renders the controlled rectifier 76 conductive from its anode to its cathode and current flows from the line 30 through the resistor $R_7$, the controlled rectifier 76, and the resistor $R_{11}$. The voltage at the cathode of the control rectifier 76 is at about 5.0 volts, and this voltage is applied through the diode $D_5$, across which a small voltage drop occurs, to the line 44. The base of the transistor $Q_6$ also is at this slightly reduced voltage because of its connection with line 44 through line 46.

The voltage divider comprised of resistors $R_{17}$ and $R_{18}$ maintains the voltage on the emitter of the transistor $Q_6$, junction 48, at about 4.0 volts. Thus, in the absence of a voltage on line 46, the transistor $Q_6$ is conductive and supplies the base emitter drive for the transistor $Q_7$ making it conductive as well. When transistor $Q_7$ is conductive, a reading may be obtained from the vehicle's fuel gauge 54. However, the appearance on line 46 and the base of the transistor $Q_6$ of the 5.0 volt signal originating from the conduction of the controlled rectifier 76, causes the base-emitter junction of the transistor $Q_6$ to be reverse-biased and it becomes nonconductive. This removes the base drive for the transistor $Q_7$ and it ceases to conduct. This results in an open circuit in the fuel-gauge circuitry, and no fuel reading can be obtained on the gauge 54 until the controlled rectifier 76 is rendered nonconductive by removal of the tamper. The controlled rectifier 76 can be rendered nonconductive if the left-hand seatbelt is allowed to be retracted so that the retractor switch $S_1$ is closed. This grounds the anode of the controlled rectifier 76 through the line 80 and the switch $S_1$.

To summarize the operation in the situation where the driver of the vehicle attempts to defeat the system by buckling or tucking his seatbelt behind him in an extended position, it may be seen from the above that the condition is sensed when the driver opens the left-hand door of the vehicle and exits from it. The fact that the seatbelt is left in an extended condition is sensed by a memory device, controlled rectifier 76, and upon re-entry of the vehicle, the driver must unbuckle or otherwise permit the seatbelt to take a retracted position if a fuel gauge reading is to be obtained.

Let it now be assumed that the right-hand seatbelt is held in an extended position as a result of the passenger buckling the seatbelt behind him or tucking it into a seat cushion. In this case, the right-hand seatbelt-retractor switch $S_3$ is held open. When the passenger leaves the vehicle, the right-hand seat-sensor switch $S_4$ opens.

With the ignition switch in the "run" position, current flows through the resistors $R_6$, $R_4$ and $R_5$. This causes the voltage at poing C to be approximately 9.3 volts. This voltage at point C forward-biases the emitter-base junction of the transistor $Q_2$ to render it conductive. Current then flows through the line 42, the diode $D_8$, and the line 44 to the upper terminal of the resistor $R_{20}$ and the line 46 connected to the base of the transistor $Q_6$. The transistor $Q_6$ has approximately 8.5 volts applied to its base, which is sufficient to render it nonconductive. This removes the base drive for the transistor $Q_7$ and it, too, becomes nonconductive. This disables the fuel gauge. In summary, if the passenger seatbelt is secured in an extended position, it will probably be left in that position when the passenger exits from the vehicle. The fuel gauge remains inoperative until such time that the passenger seatbelt is returned to its retracted position.

In an attempt to defeat the purposes of the seatbelt electrical circuitry, various attempts might be made to disable it by removal of the sensor switches or warning devices. The seatbelt electrical circuit 16 includes means for sensing the operable presence of these devices in the electrical circuitry, thereby discouraging such activity.

If the left-hand seatbelt-retractor switch $S_1$ is disconnected or its wiring is cut or it is otherwise removed from the electrical circuit, the circuit reacts by disabling the fuel gauge when the door courtesy-light switch $S_5$ is activated. The fuel gauge remains disabled until the switch $S_1$ is put back into the circuit. This occurs because the switch $S_1$ is used to remove the anode voltage to the controlled rectifier 76. When the left-hand seat-sensor switch $S_2$ is open and the door courtesy-light switch $S_5$ is closed, the controlled rectifier 76 receives an input signal at its gate 74 and becomes conductive, and the transistors $Q_6$ and $Q_7$ are rendered nonconductive in the manner previously described.

If the seat-sensor switch $S_2$ is disconnected or its wiring is cut or it is otherwise removed from the electrical circuit 16, the fuel gauge is rendered inoperative as soon as the left-hand seatbelt-retractor switch $S_1$ opens, which gates the controlled rectifier 76 to its conducting condition. If the switch $S_1$ is not opened, the voltage at point C drops to about 0.7 volts and the transistors $Q_1$ and $Q_3$ are rendered conductive, energizing the warning devices 60 and 62.

If switches $S_3$ and/or $S_4$ are disconnected or their wires are cut or they are otherwise removed from the circuit, the voltage at point C will rise to about 9.3 volts, thereby, energizing the transistor $Q_2$ which, in turn, renders the transistors $Q_6$ and $Q_7$ nonconductive to disable the fuel gauge 54.

The transistor $Q_4$ is used to detect the removal of the buzzer 60, and the transistor $Q_5$ is used to detect the removal of the warning light 62. With the warning buzzer 60 connected within the circuit of FIG. 1 as shown, the transistor $Q_4$ has its base-emitter junction forward-biased and is in a conductive state. This is true even if the transistor $Q_3$, which energizes the buzzer 60, is in a conductive state because the voltage at the anode of the diode $D_3$ then is approximately 1.4 volts above ground. Thus, current is supplied through the resistor $R_{13}$ to the base of the transistor $Q_4$. Similarly, the transistor $Q_5$ is in a conductive state as long as the warning light 62 is in the circuit. If the transistor $Q_3$ is conductive, energizing the warning light 62, the voltage at the anode of the diode $D_2$ is approximately 1.4 volts above ground, and current is supplied through the resistor $R_{14}$ to the base of the transistor $Q_5$.

When the transistors $Q_4$ and $Q_5$ are fully conductive, their collectors are at approximately 0.2 volts with respect to ground. These voltages are applied, respectively, to the anodes of the diodes $D_7$ and $D_6$. In this condition, the diodes $D_7$ and $D_6$ are reverse-biased because their cathodes are connected to the line 46, which is at a voltage of approximately 3.3 volts when the transistor $Q_6$ is conductive.

If the warning buzzer 60 has its wires cut or it is otherwise removed from the circuit, the transistor $Q_4$ is rendered nonconductive due to the absence of a base input signal. Similarly, removal of the warning light 62 renders the transistor $Q_5$ nonconductive. When the transistor $Q_4$ is rendered nonconductive, the junction between the resistor $R_{15}$ and the diode $D_7$ very nearly reaches 12 volts, thereby, forward-biasing the diode $D_7$ and applying approximately 11 volts to the base of the transistor $Q_6$ through the line 46. This renders the transistor $Q_6$ and $Q_7$ nonconductive to disable the vehicle's fuel gauge 54. A similar result occurs when the transistor $Q_5$ is rendered nonconductive.

In the circuit of FIG. 1, the fuel gauge 54 is disabled whenever the transistor $Q_2$ or the controlled rectifier 76 are energized or when the transistors $Q_4$ and $Q_5$ are rendered nonconductive. This is intended to inconvenience the vehicle driver whenever he, or a passenger, has tampered with the seatbelt electrical circuit 16. Rather than to disable the fuel gauge by the use of these devices, it is apparent that the various output signals can be used to disable other electrical circuitry in the motor vehicle or, on the other hand, to energize a warning device, such as a buzzer or horn, or to energize an ignition-system interlock to prevent the vehicle's engine from being started.

Figure 2:
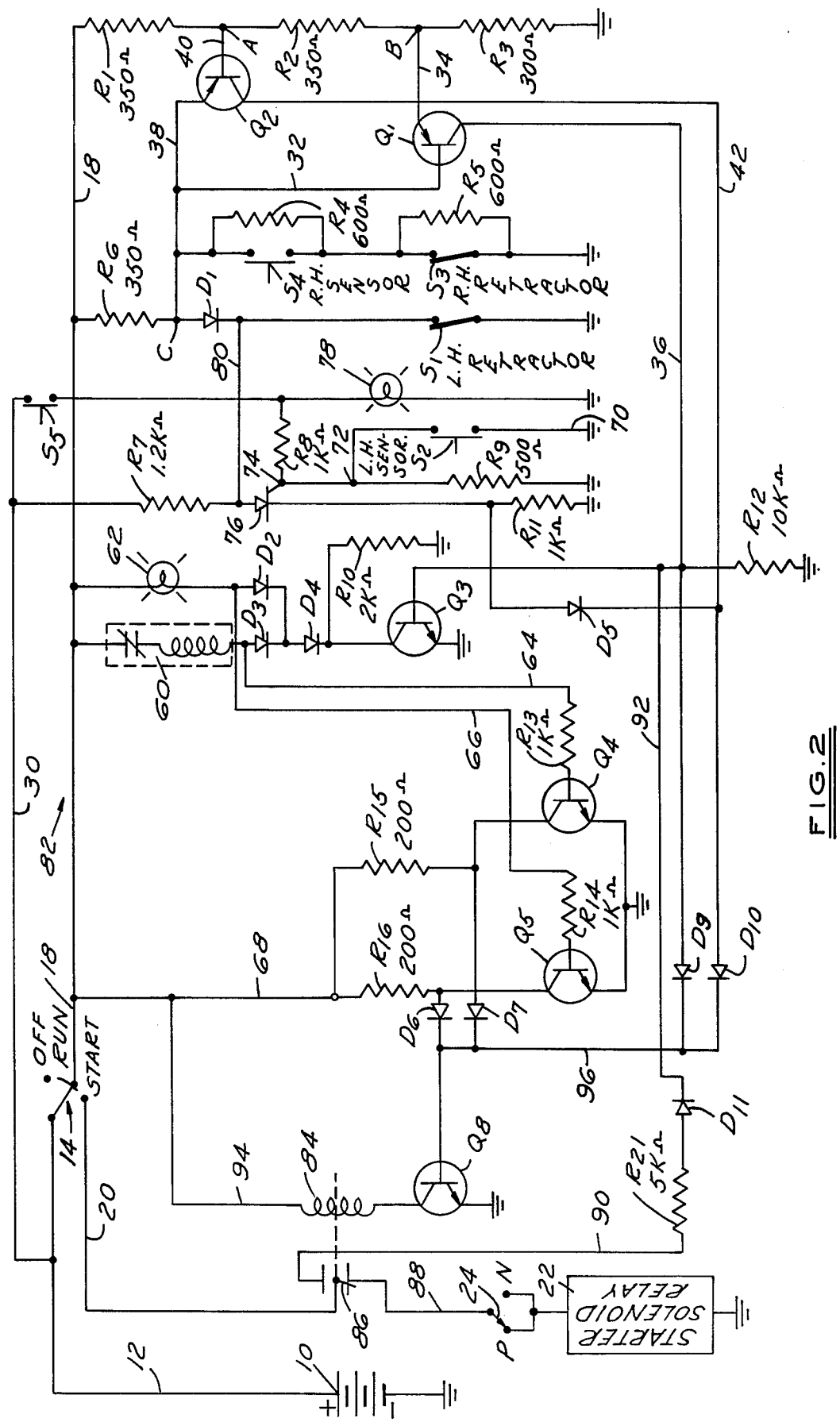
FIG. 2 is a schematic diagram of another embodiment of tamper-proof electrical circuitry constructed in accordance with the invention.

In FIG. 2, there is shown a tamper-proof electrical circuit, generally designated by the numeral 82, which, rather than to deenergize a fuel gauge, energizes an ignition interlock relay coil to prevent the vehicle's engine from being started.

In the circuit of FIG. 2, an ignition-interlock relay coil 84 is used to control a double throw relay contact 86. When the relay coil 84 is unenergized, the relay contact is in the closed position shown in the drawing. Upon energization of the relay coil 84, the relay contact 86 opens the circuit between the line 20 and the line 88, thus, prohibiting current flow through the transmission switch 24 to the starter solenoid relay 22. Instead, the relay contact 86 connects the line 20 with a line 90 that leads to one terminal of a resistor $R_{21}$. The other terminal of the resistor $R_{21}$ is connected to a diode $D_{11}$, the cathode of which is connected by a line 92 to the junction formed between the base of the transistor $Q_3$ and the resistor $R_{12}$. In this circumstance, the voltage on the line 20 is applied through the resistor $R_{21}$ and the diode $D_{11}$ to the base of the transistor $Q_3$ to render it conductive and, thereby, to energize the warning buzzer 60 and the warning light 62.

From the above, it is apparent that the ignition interlock relay coil 84, when unenergized, permits the vehicle's engine to be started. However, when the ignition interlock relay coil 84 is energized, the vehicle's engine can not be started and the warning buzzer 60 and warning light 62 are energized whenever the ignition switch 14 is in either the "run" or "start" positions.

The various ways in which the ignition-interlock relay coil 84 may be energized will now be described.

A transistor $Q_8$ has its collector connected to one terminal of the ignition-interlock relay coil 84 and has its emitter connected to ground. The other terminal of the coil 84 is connected through a line 94 and through the line 68 to the supply line 18. The base of the transistor $Q_8$ is connected to a line 96. The collector of the transistor $Q_1$ is connected by the line 36 and a blocking diode $D_9$ to the line 96 and, thus, to the base of the transistor $Q_8$. Similarly, the collector of the transistor $Q_2$ is connected by the line 42 and a blocking diode $D_{10}$ to the line 96. Also, the cathode of the controlled rectifier 76 is connected through the diode $D_5$ and the diode $D_{10}$ to the line 96. The collectors of the transistors $Q_4$ and $Q_5$ are connected, respectively, through the diodes $D_7$ and $D_6$ to the line 96.

The operation of the transistors $Q_1$, $Q_2$, $Q_3$, $Q_4$ and $Q_5$, as well as the operation of the controlled rectifier 76, is as described in connection with the circuit of FIG. 1. For example, when the transistor $Q_1$ is conductive, the voltage on the line 36 is raised and the transistor $Q_3$ is energized to permit current to flow through the warning devices 60 and 62, and when the transistor $Q_2$ is energized, the voltage on line 42 is raised. Under normal circumstances, the voltages on lines 36 and 42 are at or near ground potential and the transistor $Q_8$ is nonconductive. However, when either of the transistors $Q_1$ or $Q_2$ becomes conductive, the voltage on their respective lines 36 and 42 is raised and is applied through the diodes $D_9$ or $D_{10}$ to the base of the transistor $Q_8$ through the line 96. This causes the transistor $Q_8$ to conduct and energize the ignition-interlock relay coil 84.

When the controlled rectifier 76 is energized in the manner previously described, the voltage at the cathode of controlled rectifier 76 is applied through the diodes $D_5$ and $D_{10}$ and the line 96 to the base of the transistor $Q_8$ to render it conductive. Again, this energizes the ignition-interlock relay coil 84.

When the transistors $Q_4$ or $Q_5$ are rendered nonconductive by the removal of the warning buzzer 60 or the warning light 62, then their collector voltages are raised as previously described and these voltages are applied, respectively, through the diodes $D_7$ and $D_6$ to the base of the transistor $Q_8$ to render it conductive. This, of course, energizes the ignition-interlock relay coil 84 to prevent the vehicle's engine from being started.

The transistors used in the circuits of FIGS. 1 and 2 may be of the following types:

| Transistor | Type |
| --- | --- |
| $Q_1$ | PNP 2N5447 |
| $Q_2$ | PNP 2N5447 |
| $Q_3$ | NPN Texas Instruments, Inc., #TIP32 |
| $Q_4$ | NPN 2N5449 |
| $Q_5$ | NPN 2N5449 |
| $Q_6$ | PNP 2N5447 |
| $Q_7$ | NPN Texas Instruments, Inc., #TIP32 |
| $Q_8$ | NPN Texas Instruments, Inc., #TIP32 |

It will be apparent to one skilled in the art that various modifications in the circuitry of the invention and in the components used may be made without departing from the spirit and scope of the invention. Based upon the foregoing description of the invention, what is claimed and desired to be protected by Letters Patent is:

What I claim is:

1. A tamper-proof electrical circuit for a motor vehicle having at least one seating position equipped with a retractable seatbelt for the protection of an occupant of said seating position, said electrical circuit comprising:
   first switching means for sensing whether said seatbelt is in a retracted or in an extended position;
   second switching means for sensing whether or not said seating position is occupied;
   first circuit means for sensing a condition in which said first switching means indicates that said seatbelt is in an extended position while said second switching means indicates that said seating position is unoccupied; and
   second circuit means for disabling at least a portion of the electrical circuitry in said motor vehicle subsequent to the sensing by said first circuit means of said condition.

2. A tamper-proof electrical circuit in accordance with claim 1, wherein said motor vehicle includes a fuel gauge connected in electrical circuit with said second circuit means, said second circuit means disabling said fuel gauge upon the sensing by said first, circuit means of said condition.

3. A tamper-proof electrical circuit in accordance with claim 1, wherein said motor vehicle includes a circuit to permit its engine to be started and wherein said second circuit means is electrically connected to said motor vehicle starting circuit, said starting circuit being disabled by said second circuit means when said first circuit means senses the occurrence of said condition.

4. A tamper-proof electrical circuit for a motor vehicle having at least one seating position equipped with a retractable seatbelt for the protection of an occupant of said seating position, said electrical circuit comprising:
   a first switching device for sensing whether said seatbelt is in a retracted or extended position;
   a second switching device for sensing whether or not said seating position is occupied;
   circuit means connected with said first and second switching devices for sensing their operable presence in said electrical circuit.

5. A tamper-proof electrical circuit in accordance with claim 4, wherein said electrical circuit includes a warning device and wherein said circuit means for sensing the operable presence of said first and second switching devices includes circuit means for actuating said warning device when either of said switching devices is inoperable.

6. A tamper-proof electrical circuit in accordance with claim 4, wherein said circuit means for sensing the operable presence of said first and second switching devices includes circuit means for disabling at least a portion of the electrical circuitry of said motor vehicle when either of said switching devices is inoperable.

7. A tamper-proof electrical circuit for a motor vehicle having at least one seating position equipped with a retractable seatbelt for the protection of an occupant of said seating position, said electrical circuit comprising:
   a first switching device for sensing whether said seatbelt is in a retracted or an extended position;
   a second switching device for sensing whether or not said seating position is occupied; and
   circuit means connected with said first and second switching devices for disabling at least a portion of the circuitry of said motor vehicle, said circuit means for disabling said motor vehicle circuitry being actuated if said first switching device senses that said seatbelt is extended while said second switching device senses that said seat is unoccupied.

8. A tamper-proof electrical circuit in accordance with claim 7, wherein said motor vehicle includes a fuel gauge connected with said circuit means and wherein said fuel gauge is disabled upon the actuation of said circuit means.

9. A tamper-proof electrical circuit in accordance with claim 7, wherein said motor vehicle has an electrical circuit for starting its engine, said starting circuit being connected with said circuit means and said starting circuit being disabled when said circuit means is actuated.

10. A tamper-proof electrical circuit for a motor vehicle having an ignition circuit and at least one seating position equipped with a retractable seatbelt for the protection of an occupant of said seating position, said electrical circuit comprising: first switching means for sensing whether said seatbelt is in a retracted or in an extended position; second switching means for sensing whether or not said seating position is occupied; a solid state switching device connected with said ignition circuit of said motor vehicle, said solid state switching device being changeable from one conductive state to an other conductive state; and circuit means connected with said solid state switching device for changing it from said one conductive state to said other conductive state when said first switching means senses that said seatbelt is in an extended position at a time when said second switching means senses that said seating position is unoccupied.

11. A tamper-proof electrical circuit in accordance with claim 10, wherein said electrical circuit further includes circuit means connected with said solid state switching device for sensing the removal from said electrical circuit of said first switching means and for changing said solid state switching device from said one conductive state to said other conductive state.

12. A tamper-proof electrical circuit in accordance with claim 10, wherein said electrical circuit further includes circuit means connected with said solid state switching device for changing said solid state switching device from said one conductive state to said other conductive state when said second switching means has been electrically removed from said electrical circuit.

13. A tamper-proof electrical circuit in accordance with claim 10, wherein said electrical circuit further includes a warning device, a second solid state switching device connected with said warning device, and circuit means interconnecting said first solid state switching device and said second solid state switching device and said warning device for changing said first solid state switching device from said one conductive state to said other conductive state upon the removal from said electrical circuit of said warning device.

14. A vehicle safety seat belt system including, a vehicle seat, a safety belt means for restraining an occupant in said seat, alarm means, a safety circuit including seat switch means operable by an occupant at a seat position, switch means operable by predetermined positioning of said safety belt means, and means operable by said seat switch means and said safety belt means to energize said alarm means for indicating the non-sequential respective operation thereof.

15. A vehicle safety seat belt system including, a vehicle seat, a safety belt means for restraining an occupant in said seat, vehicle control means, a safety circuit including seat switch means operable by an occupant at a seat position, switch means operable by predetermined positioning of said safety belt means, and means operable by said seat switch means and said safety belt means to prevent normal vehicle operation unless said seat switch means is actuated prior to said safety belt means.

* * * * *